United States Patent

[11] 3,609,426

| [72] | Inventor | Richard Gaul<br>Metz, Moselle, France |
|---|---|---|
| [21] | Appl. No. | 820,353 |
| [22] | Filed | Apr. 30, 1969 |
| [45] | Patented | Sept. 28, 1971 |
| [73] | Assignee | Paul Racaniere<br>Nimes, France |
| [32] | Priority | May 17, 1968 |
| [33] | | France |
| [31] | | 152,176 |

[54] INERTIA-DRIVEN STANDBY ELECTRIC GENERATOR UNIT
15 Claims, 6 Drawing Figs.

[52] U.S. Cl. .................................................. 310/112,
310/74, 310/113, 310/114, 322/9, 322/23, 322/32
[51] Int. Cl. ........................................................ H02k 17/44
[50] Field of Search ............................................. 310/112,
113, 114, 74; 322/9, 23, 32; 307/156

[56] References Cited
UNITED STATES PATENTS

| 2,376,421 | 5/1945 | Drake | 322/9 |
| 2,688,704 | 9/1954 | Christenson | 322/9 X |
| 3,030,517 | 4/1962 | Gibbons | 310/74 X |
| 3,221,172 | 11/1965 | Rolison | 322/9 X |

Primary Examiner—D. F. Duggan
Assistant Examiner—Mark D. Budd
Attorney—Jacobi, Davidson, Lilling & Siegel ABSTRACT: A flywheel rotated above the mound speed of a generator is selectively coupled to the generator through a variable-speed clutch upon power failure to keep the generator speed constant during the time it takes to substitute a standby power source.

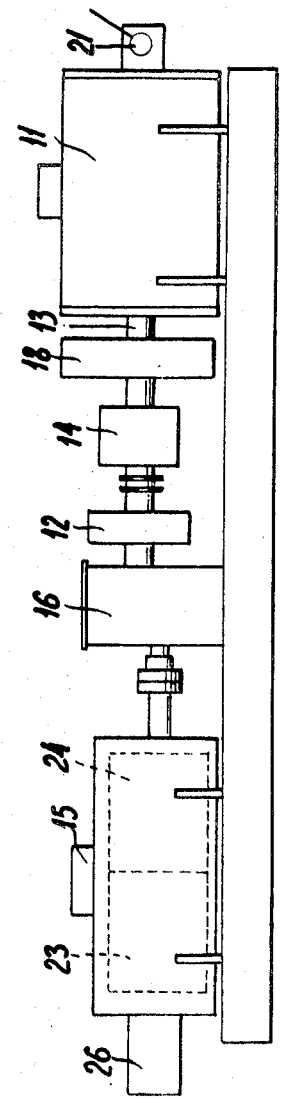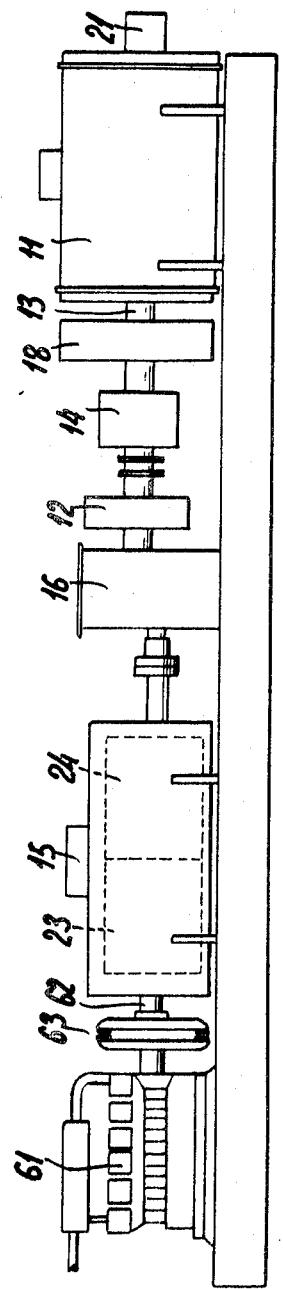

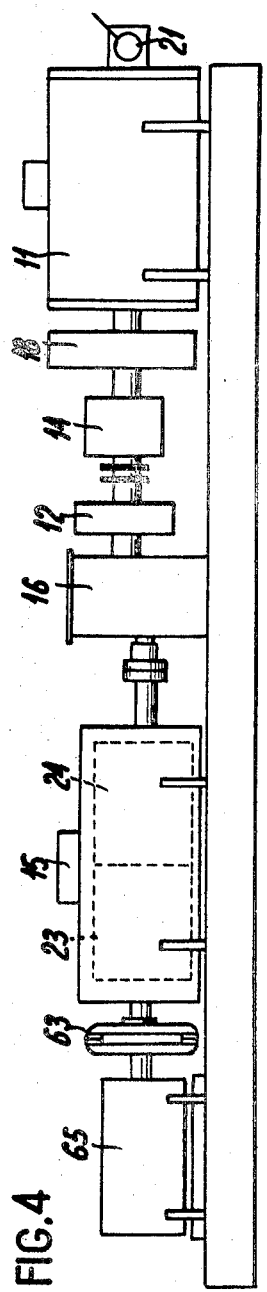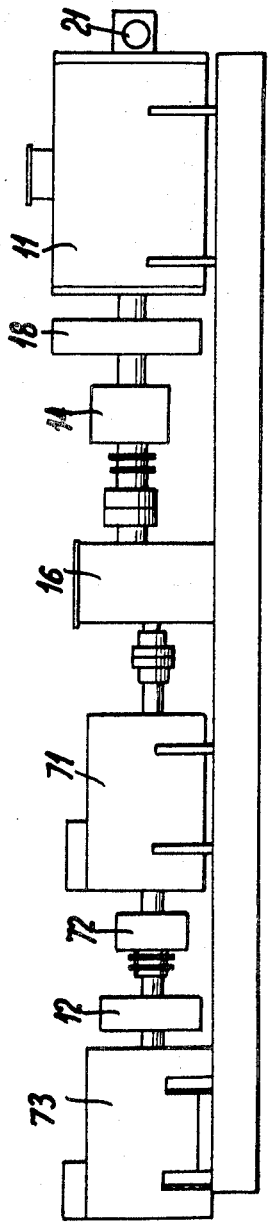

INERTIA-DRIVEN STANDBY ELECTRIC GENERATOR UNIT

The present invention relates to an installation for generating electric current for a user network normally supplied by an electric power grid. This installation will hereinafter be referred to as an "Inertia-driven Standby Electric Generator Set."

For supplying particular priority users which are required to continue in operation even in case of failure of the main supply an emergency or standby generator set has to be provided for instance driven by an independent prime mover such as an internal combustion engine. However, even with quick-starting engines, an interruption of the supply, even if only for a few seconds, may be unavoidable On the other hand, some such priority users cannot be exposed to such, however temporary stoppages without risk of total breakdown to the service. This is the case for example with particular electronic installations such as those incorporating radar scanners or computer. It is in such case necessary to provide an inertia drive, e.g. an alternator with a flywheel keyed on its shaft, which is kept continuously running. By such means the supply can be maintained during the starting lag or delay time of an emergency or standby generator, by the energy stored in the flywheel. Since in the general case such priority user networks have to be operated at a substantially constant frequency, e.g. within ±1 percent, it is necessary, in order to fulfill such a condition during the time the inertia drive is operating, to fit very heavy flywheel masses. Emergency installations of this kind are consequently costly and the consumption of energy in maintaining them in constant standby readiness, is relatively considerable.

The object of the present invention is to provide an inertia-driven standby generator obviating or mitigating the above inconveniences, in which the flywheel masses are considerably less than those of existing inertia generators of conventional type.

The present invention is an inertia-driven standby electric generator set including a rotary electric generator, a flywheel, a continuously variable-speed coupling clutch fitted between the generator shaft and the said flywheel, means for controlling the said variable-speed ratio acting in response to a drop in one of the instantaneous, characteristic values of the generator, and actuating means for rotating the said flywheel.

In accordance with a preferential form of embodiment of the invention the coupling means selected consist of a sliding or slipping clutch, such as magnetic powder clutch, and the flywheel is run while on standby at a higher speed, e.g. 1½ to 2 times faster than the generator speed, usually in this case an alternator.

With such an arrangement it is possible to ensure feeding the user circuit by the inertia drive during a period of, say, 10 seconds, which affords for starting up a thermal engine-driven standby generator without resorting to the instantaneous start devices.

Embodiments of the present invention will now be described by way of example, with reference to the accompanying drawings, in which:

FIG. 1 is a diagrammatic sketch in elevation of a first form of embodiment of a generator set for emergency use with a standby inertia drive according to the invention;

FIG. 3 is a second form of embodiment analogous to that in FIG. 1, but further incorporating an internal combustion engine;

FIG. 4 shows a third form of embodiment similar to that of FIG. 1, but further equipped with a direct current electric motor; and FIG. 5 is a view of a fourth form of embodiment of an emergency electric generator with a standby inertia drive according to the invention; while

The inertia-driven standby electric generating set shown in FIG. 1 is intended to supply a priority network 1 (FIG. 2) without any interruption in spite of any failure of the normal supply 2 feeding the said priority user in particular until the conventional standby generator 3 is able to supply the said priority user for as long as the interruption of the normal supply source 2 continues.

Figure 2:
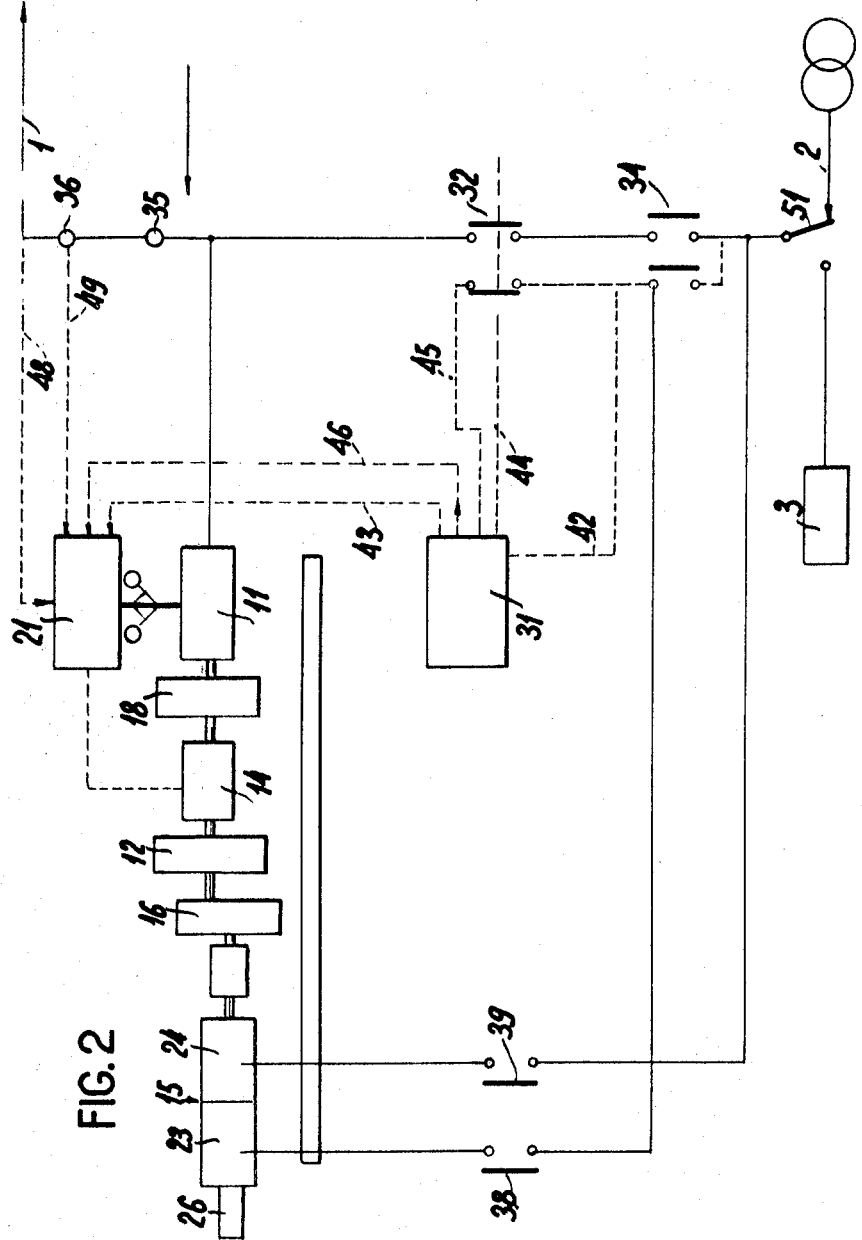
FIG. 2 is a diagram of the electric installation in the generator set according to FIG. 1.

The inertia-driven standby electric generator shown in FIGS. 1 and 2 consists of a rotary generator 11 which in the actual example is an alternator, a first flywheel mass 12 connected with the shaft 13 of the said, alternator through a variable-speed ratio coupling 14, and a two-speed asynchronous electric motor 15 coupled with the flywheel 12 by means of a transmission gear with a ratio of the order 1:6. The shaft 13 further carries a second flywheel mass 18.

For an alternator 11 of an output of, e.g. the order of 40 kw., the first flywheel 12 would have a weight of the order of 180 kg., and the second flywheel 18 a weight of the order of 500 kg.

The coupling clutch 14 is preferentially of the magnetic powder-type the excitation current whereof is regulated by a governor 21 (see also FIG. 2), coupled with the alternator in such manner that when the said alternator is driven by the kinetic energy stored in the first flywheel 12, its speed is held substantially constant by the slipping of the clutch as the flywheel loses speed.

Let the speed of the alternator 11 be, for example, 1,500 r.p.m., and the asynchronous motor 15 have a primary winding 23 for rotation at 1,500 r.p.m. and a secondary winding 24 for running at 3,000 r.p.m. The purpose of the step-up speed gear is to allow for the slip in the coupling or magnetic powder clutch 14 and the asynchronous motor 15. This asynchronous motor 15 has a centrifugally acting contact 26.

In the diagram on FIG. 2, a synchronizing coupling 31 is further shown, which connects the alternator with the network, a coupling contact 32, a cutout 34, a detector 35 for the voltage drop, a detector 36 for the power drop, and the contacts 38, 39 feeding the two windings 23 and 24 of the two-speed asynchronous motor. There are also shown, associated with the synchronizing coupling 31, comparator circuits 42, 43, an order circuit 44, a feeder circuit 45, the "faster/slower" signal circuit 46 and, associated with the governor 21, a feeder circuit 48 and a wattmeter circuit 49.

The action of the installation shown in these figures 1 and 2 is as follows:

First of all, the installation is brought into the standby setting. For this purpose, the cutout 34 being closed, the magnetic powder clutch is is activated in such a manner as to transmit its maximum torque, which is effected automatically by the fact that the alternator 11 is stopped and the governor 21 consequently tends to increase its speed so as to reach the nominal value of 1,500 r.p.m.

The contact 38 feeding the asynchronous motor 15 is closed so as to activate the corresponding winding 23 causing the said motor to rotate at the lower speed of 1,500 r.p.m. The rotor of the asynchronous motor 15 then drives the rotor of the alternator 11 through the step-up gear 16 and the magnetic powder coupling 14, which rotor, after a certain time, reaches its nominal, rated speed 1,500 r.p.m., allowing for the ratio of 1:6 of the speed-transmission gear 16 which compensates the slip in the asynchronous motor 15 and the magnetic powder coupling 14.

When the alternator as reached its rated or nominal speed, it is put in phase with the network 2 through the intermediary of the synchronizing clutch or coupling 31 which influences the magnitude of the excitation current of the magnetic powder clutch 14 trough the speed governor 21. When the conditions for the correct coupling of the alternator with the network have been fulfilled, the synchronizing coupling 31 closes the coupling contact 32, and the alternator is now connected with the network 2.

After this coupling, the excitation current of the magnetic powder coupling 14 is cut out; from this instant, no power is transmitted from the asynchronous motor 15 to alternator 11.

This interruption of the current feeding the winding (low-speed stage) of the asynchronous motor is followed by switching on the high-speed winding 24 (of this motor) in such manner as to accelerate the flywheel 12 to its maximum speed of substantially 3,000 r.p.m.

In case of failure of the normal feeder network 2, the usual standby generator set 3 will be started by the action of the changeover switch 51, to ensure the supply to the priority user network 1; but meanwhile, the special inertia-driven generator set described above, will ensure the temporary supply of current to the said priority network, without any interruption.

As soon as a voltage or frequency drop is detected, the alternator is immediately disconnected from the network 2, but the kinetic energy stored in the second flywheel 18 keyed on the alternator shaft 13 will temporarily, e.g. during a period of 0.3 sec., ensure the continuing rotation of the alternator practically at its rated speed, in order to provide a practically continuous, temporary supply to the priority user network 1. During this brief period of time the excitation current of the magnetic powder coupling 14, now supplied by the alternator 11 through feeder circuit 48 and governor 21, has had time to become steady at a suitable value for driving the alternator at its rated speed, using a part of the kinetic energy stored in the first flywheel mass 12. The governor 21 adjusts the value of the excitation current of the coupling, to a steady value such that the slip in the said coupling ensures the driving of the alternator rotor exactly as its rated speed, despite the progressive deceleration of the flywheel in the measure of its loss of stored kinetic energy.

The running time in these conditions, obviously depends on the totality of all the characteristics of the installations: it can, for instance, be of the order of 5 to 10 seconds.

As soon as the standby generator set 3 is able to ensure the supply to the priority user network 1, i.e. before the lapse of the aforesaid 5 to 10 seconds, the synchronizing coupling 31 seeks to ensure the coupling of the alternator with the current of the standby set 3, in the same conditions as previously indicated for its coupling with the normal supply network 2. It will be noted that, even if the operation of phase-adjusting the alternator for the purpose of coupling it with the network should last for a longer time, e.g. 1 minute, the priority network will still be suitably supplied during this interval, from the standby generator 3. However, it remains necessary to maintain the alternator at its rated speed during the whole of this interval. This is why, as soon as the speed of the flywheel 12 tends to fall below the rate 1,500 r.p.m., the current to the low-speed winding 23 of the asynchronous motor 15, now supplied by the generator set 3, and further the current to the high-speed winding 24, also now supplied by the generator set 3, are again restored, with at the same time, the continuing acceleration of the flywheel 12.

The installation described above owing to its connection in parallel with the main supply source 2 provides highly reliable functioning without interruption, which would not be possible with a cascade-connected installation, since any breakdown in the machine would inevitably cause a discontinuity in the standby circuit.

During periods of standing by, alternator is under no load, since the power takeoff of the priority network 1 is entirely furnished by the main supply network 2 or the standby generator 3. The alternator 11 functions as a motor and it is necessary to supply the inertia-driven set only with the power necessary to maintain the rotation of its components: e.g., a power of the order of 5 kw. for a rated output of 40 kw.

The efficiency of any other usual, cascade-connected standby installation, is much lower than this. In fact, for the same output, the combination of the difference efficiencies, e.g. that of the alternator of the order of 0.9, and of the asynchronous motor of the order of 0.85, the final, overall efficiency obtained, is of the order of 0.765, and consequently the losses are practically double those of the present installation. Moreover, losses in the magnetic powder clutch are nil in the present installation, while they are proportional to the torque and slip in existing cascade-connected installations.

Besides this, in the present installation wear is negligible, since on the one hand the alternator is practically never in full service, it being only used to fill the gap in case of failure of the principal supply network 2, or the emergency generator set 3, normally employed continuously feeding into the priority network 1. The principal components subject to wear, viz, the clutch element formed by the powder coupling and the step-up gear, are practically never under load, so that their life is of considerable length.

During emergency running, the control of the standby generator 3 is greatly facilitated, since ample time is available for coupling the alternator with the standby generator 3 during the transition period when the alternator continues to be run at its rated speed by using the kinetic energy stored in the flywheels 12 and 18, and the asynchronous motor 15.

The reliability of the installation can easily be enhanced by adding supplementary devices for supplying the mechanical energy required to feed the alternator after the lapse of 6 or 7 seconds for instance, during which the kinetic energy of the flywheels has been in full use.

For instance, as shown in FIG. 3, it is possible to couple an internal combustion engine 61 to the shaft 62 of the asynchronous motor 15, through a clutch element 63, suitably of the electromagnetic type. In case of a failure in the principal supply systems 2 or 3, lasting for a time longer than that for which the inertia drive is rated, the clutch 63 can be engaged and the internal combustion engine started to allow the alternator to supply the power required for the priority network 1.

The embodiment shown in FIG. 4 differs from the embodiment according to FIG. 3 in that the internal combustion engine has been replaced by a direct current electric motor 65, taking current from storage batteries. This motor can be shunt- or compound-wound and run at a speed appreciably higher than the rated speed of the alternator 11.

Thus, in case of failure of the main supply network 2, followed by failure of the standby generator set 3, the priority user 1 could continue to be supplied, always without interruption, by the alternator 11, ultimately run by the internal combustion engine 61 in the embodiment according to FIG. 3, or by the electric motor 65 in the embodiment according to FIG. 4, for short-time operation.

The assembly described above and shown in FIG. 2, in case of failure of the main supply network 2 due to an ordinary short circuit, will cause a voltage drop on two or three alternations, which in some cases may amount to 30 percent of the value of the rated voltage.

This voltage drop can be appreciably reduced by connecting the alternator in series with a transformer, the impedance of which will reduce the value of the short circuit current through the supply network. In these conditions, the transient drop in the voltage over 1 or 2 cycles, will not exceed about 10 percent to 15 percent.

If it is nevertheless desired to eliminate this drop, the alternator must be connected in series or in cascade with the priority user network 1 to be maintained.

As in the case of the parallel-connected set described above, a governor-controlled coupling is used. The installation is then of the kind shown in FIG. 5 and comprises an alternator 11, a flywheel 18 keyed on the alternator shaft, and the coupling clutch 14 controlled by a governor 21 driven off the alternator, the step-up transmission gear 16, a principal asynchronous motor 71 for low-speed drive at e.g. 1,500 r.p.m., a further, magnetic powder coupling 72, controlled by the governor to interconnect the motor 71 with a second asynchronous motor for high-speed drive at, say, 3,000 r.p.m., and the flywheel 12 keyed on the shaft of the last-named motor.

In operation, as in the forms of embodiment already described, the asynchronous electric motor 71 for low-speed drive, supplies the power required by the alternator, its speed being raised to the appropriate slip value by the gear 16. The alternator speed is governed by the governor acting on the excitation current of the magnetic powder coupling 14.

Normally, i.e. during the standby time, the clutch 72 is not energized, so that no power is transmitted from the motor 73. The flywheel 12, the high-speed asynchronous motor 73 and the part of the clutch 72 connected therewith run at the top speed 3,000 r.p.m., allowing for the slip.

In case of failure of the main supply network, energy is supplied by the rotating masses of the flywheel 18 and of the alternator 11 during the time necessary for the governor and the clutch 72 to respond, i.e. during about 0.2 to 0.3 sec. Thereafter and until restoration of the phase voltage at the terminals of the alternator, the energy is supplied by the rotating masses of the flywheel 12 and the asynchronous motor 73 running at high speed, which can decelerate progressively from 3,000 to 1,500 r.p.m.

Figure 6:
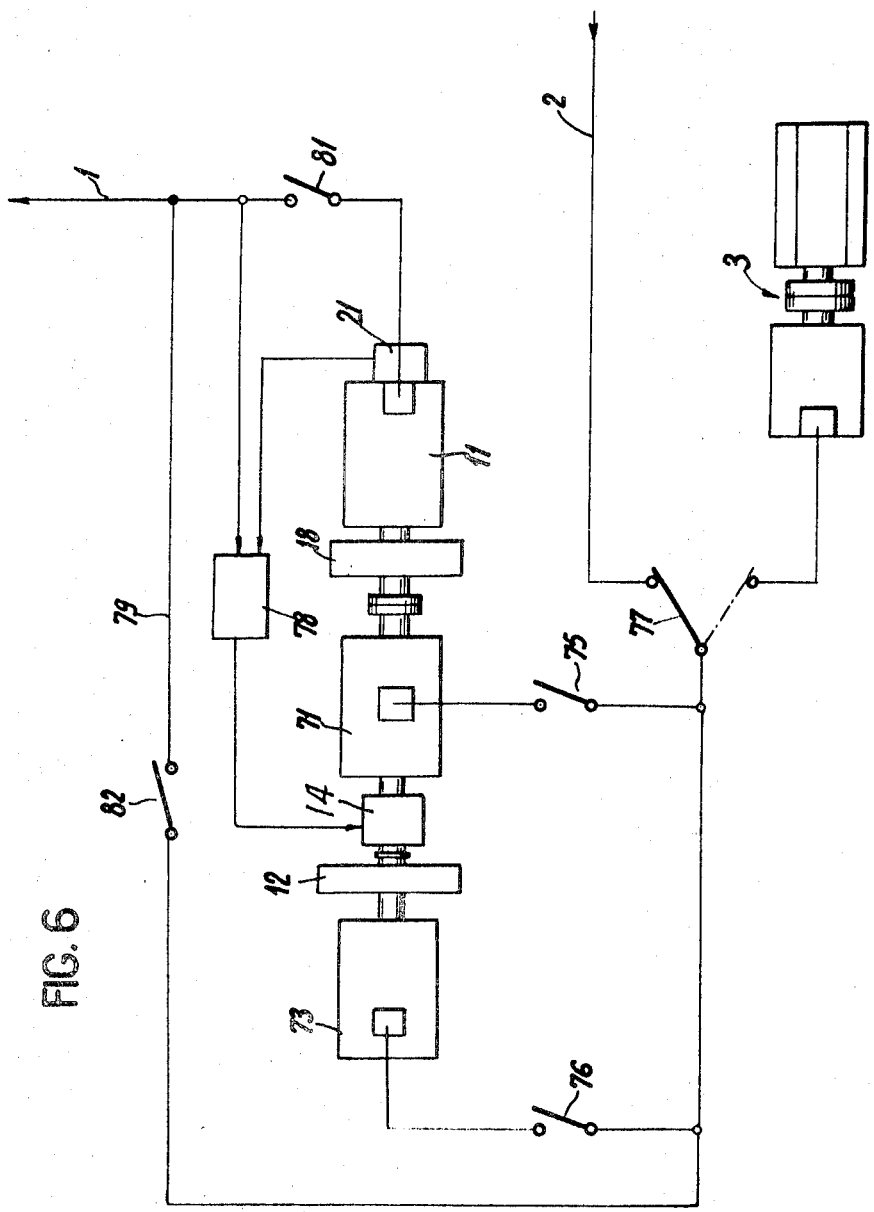
FIG. 6 is a fifth form of embodiment of the invention.

Finally, the generator set shown in FIG. 6 is for use in the following working conditions:

a. Whenever the voltage fluctuation in the transient period, i.e. over one-quarter of a cycle, should not exceed ±15 percent of the maximum voltage, in any condition for restarting even in case of a complete short circuit of the main network supplying the priority user. (It should be remembered that the peak voltage is 1.44 times the rated voltage of the network, thus reducing the fluctuation to a negligible means value).

b. When the power takeoff does not exceed some value of kilowatts and the performance of the installation takes account of the cascade connection of the generator set.

c. If the frequency variation specified, does not exceed ±4 percent with reference to the rated frequency of the network.

This generator set comprises an alternator 11 feeding the network 1, from the supply network 2 and on the shaft whereof the second flywheel mass 18 is keyed, an asynchronous electric motor 71, for low-speed running, directly coupled with the shaft of the alternator 11, a high-speed asynchronous electric motor 73 the shaft whereof carries the flywheel mass 12 and is connected with the shaft of the low-speed electric motor 71 by a variable-speed transmission clutch 14.

The low speed electric motor 71 runs at a speed between 1,500 and 1,460 r.p.m. for instance, for a frequency of 50 cycles at the alternator, while the high-speed electric motor 73 is run, e.g. at a speed between 2,850 and 3,000 r.p.m.

There are further shown: the normal supply network 2 intended to feed the priority user network 1, and a conventional standby generator unit 3, as well as the governor 78 controlling the coupling clutch 14.

An emergency shunt circuit 79 including a switch 82 allows the alternator 11 to be shunted, e.g. for repair or maintenance.

To put the set on standby running, the switches 81 and 82 are opened and the switch 75 feeding the low-speed asynchronous motor 71 is closed.

The low speed motor 71 runs the flywheel 18 and the alternator 11 up to their rated speed of the order of 1,500 r.p.m., When the alternator 11 has attained its rated speed the controller 78 ensures that the clutch 14 does not operate. The switch 76 is now closed and the high-speed asynchronous motor and its flywheel 12 run up to the desired higher speed. The switch 81 is now closed to supply the network 1 from the alternator 11, and the set is now in a state of "standby for emergency." The switch 82 remains open during running of the set.

If a voltage or a frequency drop are detected in the supply network of the low-speed asynchronous motor 71, or in the speed of governor 21 driven by the alternator 11, the arrangement allows automatic starting and coupling of the standby generator set while ensuring the temporary supply of the network, the inertia driven generator operating, in a first phase, to maintain the supply to the priority user 1 without interruption.

The operation in emergency running is accordingly as follows:

As soon as the main supply network 2 fails, the switch 77 is set as shown in broken lines. The alternator 11 continues to supply to the priority user 1, drawing power from the kinetic energy stored in the flywheel mass 18, in the rotor of alternator 11, and in that of the low-speed asynchronous motor 71, for a time varying between 0.05 to 0.3 sec. corresponding to the constant of the coupling clutch 14 the excitation circuit of which is immediately excited by means of the governor 78. The inertia of the flywheel 18 and the rotors of the alternator 11 and the motor 71 are so calculated as to produce a deceleration of the order of 1 percent when the alternator is delivering at full speed to the priority network 1.

As soon as the clutch 14 responds, the kinetic energy stored in the first flywheel mass 12 and the rotor of the high-speed asynchronous motor 73 is drawn upon, in a second phase, to maintain the speed of the alternator 11 and the rotating masses coupled therewith.

The regulation of the speed and consequently of the frequency of the alternator operates in this phase, by varying the torque transmitted by the mechanical clutch 14 under control of the conventional electronic wattage regulator 78, itself under the control of the speed governor 21 directly coupled with the shaft of the alternator 11; the excitation current of the clutch 14 is consequently controlled according to the fluctuations detected by this governor.

During this second phase the deceleration of the first flywheel 12 and the rotor of the high-speed motor 73, the current to which has been cut off, together with the current to the low-speed motor 71, may proceed suitably from 2,850 to 1,500 r.p.m. The energy thus drawn from these rotating masses can be divided into two, principal components: the energy actually used in the priority network 1, and that which is lost by heating in the various components, for instance in the mechanical clutch 14 the two components respectively linked with the two motors 71 and 73, run at different speeds. The slip in this clutch taking place only during a few seconds (no more than 7), the clutch is designed to withstand the corresponding heating effect without detriment to its operation.

At the end of the second phase the standby generator set 3 is able to supply current to the two asynchronous motors 71 and 73. This standby generator 3 thus feeds through the changeover switch 77, at this stage closed, and the switch 75, the low-speed motor 71, the speed of which has not fallen below its rated value. In a third phase the low-speed motor 71 supplied from the generator 3 now drives the alternator 11, which has not stopped, and continues to deliver to the priority network 1 at its rated speed.

The high-speed motor 73 the speed of which has meanwhile dropped to its lower limit begins to receive current again at the end of this third phase, and resume its rated speed.

The regulators 21 and 78, effect the disconnecting of the clutch 14.

When the voltage of the main supply network is restored the switch 77 is moved into the position shown by the full lines, and the standby generator 3 is stopped.

The inertia-driven generator set is now ready to operate again, in a new cycle.

Such an assembly in cascade connection, although less economical than in parallel, has the advantage of being simpler in regard to speed control and entirely dispenses with synchronizing. Moreover, flywheel masses with a very low inertia (momentum) can be used.

In general, the output of the generator set will be restricted to some 30 kw. since the losses due to low performance of the installation would make operation somewhat costly. However, it should be noted that there is nothing to prevent increasing the output of the generator set, if the resulting working economy is not of primary importance.

The invention is of course not restricted to the forms of embodiment herein described and illustrated and numerous modifications can be introduced therein according to the intended applications without thereby transgressing the principles of the invention.

I claim:

1. An inertia-driven standby electric generator set including a rotary electric generator, a flywheel, a continuously variable-speed coupling clutch fitted between the generator shaft and the said flywheel, means for controlling the said variable-speed ratio acting in response to a drop in one of the instantaneous, characteristic values of the generator, and actuating means for rotating the said flywheel, and wherein the rotary electric generatior is an alternator having a second flywheel mass directly keyed on the alternator shaft the means of control of the aforesaid speed-transmission ratio acting in response to the frequency of the current supplied by the said alternator to maintain the said frequency substantially constant and driving means for rotating and maintaining in rotation the said second flywheel substantially at the rated speed of the alternator; the means for driving the said flywheel masses being designed and arranged so that the speed of rotation of the first flywheel is higher than that of the second flywheel.

2. A generator set as claimed in claim 1, in which the driving means of the second flywheel consist of an asynchronous motor coupled with the said flywheel through a variable-speed gear, the first flywheel being fixed on the shaft of a second asynchronous motor the said shaft whereof is connected with the shaft of the first asynchronous motor by a second, variable-speed gear.

3. A generator set as claimed in claim 1, in which the shaft of the alternator on which the second flywheel mass is keyed is directly coupled with the shaft of the asynchronous motor driving the said flywheel.

4. An inertia-driven standby electric generator apparatus for supplying current to a user network upon failure of current supplied by a main supply source, said apparatus comprising a generator means having a rated speed connectable with the user network, a flywheel, an electric motor means connectable with the main supply source to rotate the flywheel at a speed higher than the rated speed of said generator means, variable-speed transmission means connected to transmit driving torque from the flywheel to the generator means, and control means for said transmission means operable in response to changes in the electrical characteristics of the main supply source, producing corresponding changes in the speed ratio between said flywheel and said generator means such that the rated speed of said generator means is maintained substantially constant as long as the flywheel speed is above the rated generator speed.

5. A generator apparatus according to claim 4, in which a second flywheel is directly coupled to said generator means.

6. A generator apparatus according to claim 4, in which an auxiliary motor is connected to drive said flywheel independently of the current supplied by the main power source.

7. A generator apparatus as claimed in claim 4, in which said generator means is connected in parallel with the main supply source, whereby said generator means functions as a motor under normal conditions.

8. A generator apparatus according to claim 4, in which said generator means is connected to be driven by a second electric motor interposed between said variable-speed transmission means and a coupling means also controllable by said control means.

9. A generator apparatus according to claim 8, in which said second electric motor drives said generator means at the rated generator speed through said variable-speed transmission means.

10. A generator apparatus according to claim 5, wherein said generator means and said second flywheel are connected to be driven by a second electric motor interposed between said variable-speed transmission means and said second flywheel, said second motor being connectable to said main supply source.

11. A generator apparatus according to claim 10, in which said generator means has a shaft which carries said second flywheel and is directly coupled with said second electric motor.

12. A generator apparatus according to claim 4, in which said generator means is connected in series between the main supply source and the user network.

13. A generator apparatus according to claim 4, in which said variable-speed transmission means comprises a magnetic clutch-receiving energizing current from a controller operating in response to changes in the generator speed.

14. An inertia-driven standby electric generator apparatus for supplying temporary electric power to a user circuit during periods of failure of a main power supply coupled to the user circuit, said apparatus comprising:
standby electric generator means for connection to the user circuit;
inertia-mass means for storing energy;
drive means for imparting energy to said inertia-mass means during operative periods of the main power supply; and
energy transfer means coupled between said inertia-mass means and said standby electric generator means, said energy transfer means being operative during periods of failure of the main power supply to transfer energy from said inertia-mass means to said standby electric generator means, and means to control the energy transfer means so as to maintain constant generator output throughout a given time duration.

15. An apparatus as defined in claim 14, wherein said standby electric generator means is adapted to run at a rated speed, said inertia-mass means comprising a rotatable flywheel driven by said drive means at a speed higher than said rated speed, and wherein said energy transfer means comprises a variable-ratio transmission device for transmitting driving torque from said flywheel to said standby electric generator means, and said control means being operable in response to changes in said generator output to produce corresponding changes in the transmission ratio such that said standby electric generator means runs at substantially its rated speed through said given time duration.